Aug. 31, 1948.  O. JACOBSEN  2,448,147
METHOD OF FABRICATING PACKING GLANDS
Filed April 29, 1943  2 Sheets-Sheet 1
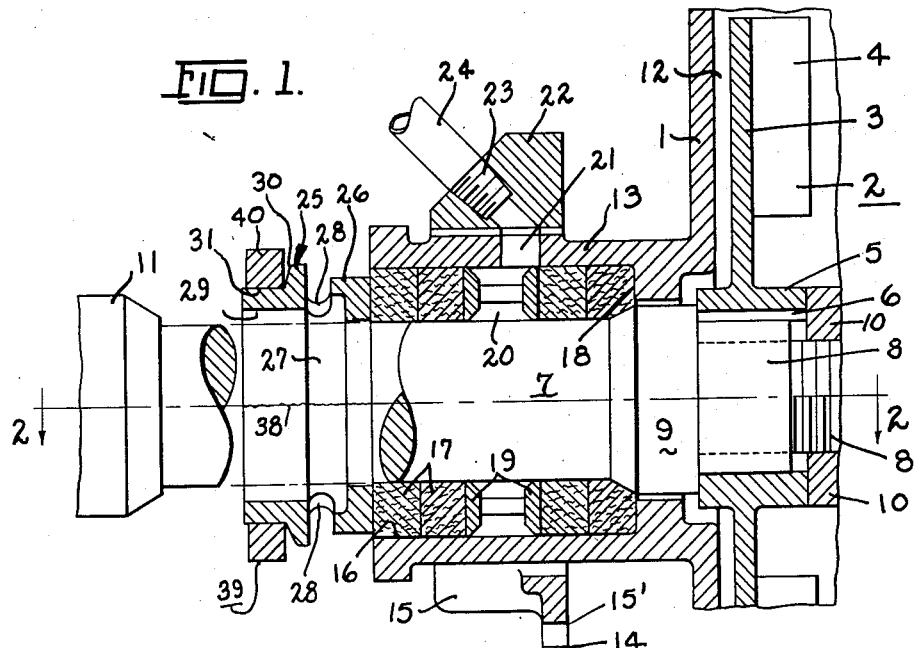
INVENTOR
OYSTEIN JACOBSEN,
BY
Toulmin & Toulmin,
ATTORNEYS Aug. 31, 1948.   O. JACOBSEN   2,448,147
METHOD OF FABRICATING PACKING GLANDS
Filed April 29, 1943   2 Sheets-Sheet 2
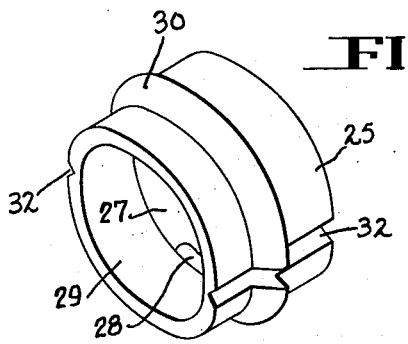
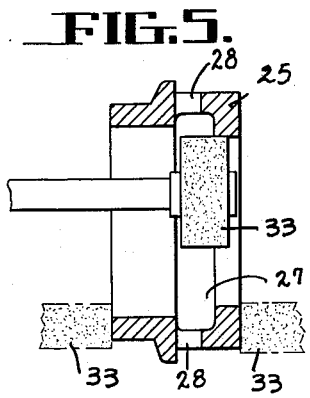
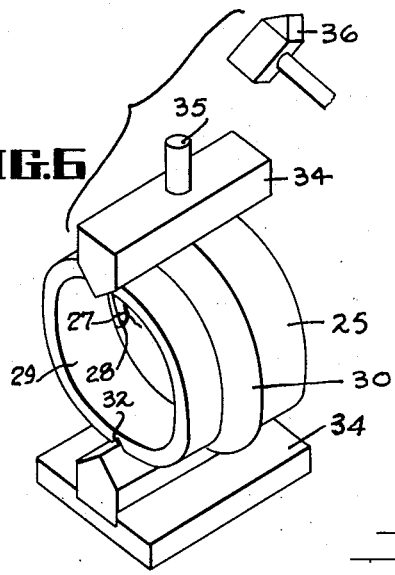
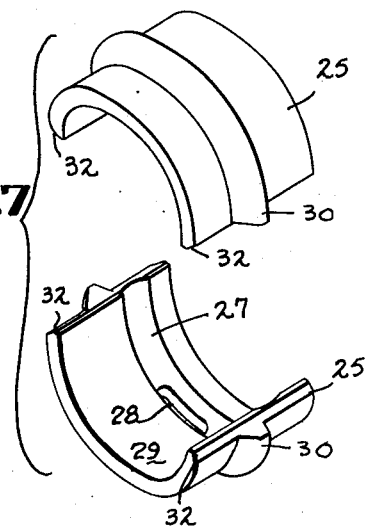
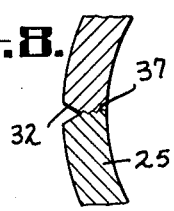
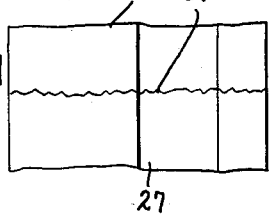
INVENTOR
OYSTEIN JACOBSEN,
BY
Toulmin & Toulmin
ATTORNEYS Patented Aug. 31, 1948

2,448,147

UNITED STATES PATENT OFFICE 2,448,147

METHOD OF FABRICATING PACKING GLANDS

Oystein Jacobsen, Montgomery County, Ohio, assignor to The Duriron Company, Inc., Dayton, Ohio, a corporation of New York Application April 29, 1943, Serial No. 484,977

2 Claims. (Cl. 29—148)

The present invention relates to centrifugal pumps, and more particularly to seals of those pumps designed to operate at considerable velocities and which are adapted to handle corrosive fluids.

In many standard forms of pumps, the impeller is mounted on an overhanging journal which is usually constituted of two or more sets of ball bearings and in which the inner ball bearing is positioned not far from the impeller. This consideration makes it necessary that the interior of the casing shall be effectively sealed from that part of the shaft which extends beyond the casing toward the ball bearings, so that none of the liquid can reach the bearings to impair their effectiveness.

In order to prevent creepage of the corrosive fluid along the pump shaft toward the bearings, it is customary to provide a seal member such as packing rings which exert a sealing effect in the end thrust and radial directions. A gland is usually provided to take up the wear at the seal. This gland prior to the present invention has been made in the form of a ring, fabricated of machinable metal and having an inner diameter as snugly to fit the shaft and an outer diameter as will permit the ring to press directly against the packing. The ring forms a continuous cylinder and is placed in position by threading over one end of the shaft. Such ring is open to two objections:

1. In case the pump is handling acid-containing liquids, the metal of the ring is easily attacked by the liquid which flows past the stuffing box since machinable metals readily corrode.

2. A gland of continuous circularity may be employed only in connection with shafts which have no shoulders because otherwise the ring could not be threaded over the shaft.

Non-corrosive or highly acid-resistant metals such as high silicon iron are well known but glands of these metals are non-machinable and therefore do not lend themselves to being cut to shape and size. Consequently, such glands are open to the objection that they could not be placed in position in case the shaft was provided with shoulders of greater diameter than the interior size of the gland.

The primary object of the present invention is to provide, in connection with a stuffing or packing box for pumps which handle corrosive liquids, an improved packing gland and a method of fabricating the same.

This object is attained in brief by fabricating the packing ring or gland of an acid-resistant metal such as high silicon iron by casting the ring first in one piece but with longitudinally extending grooves to form fracture lines, then grinding the critical surfaces of the ring and thereafter breaking the ring into two parts at the fracture lines so that the parts may be suitably held together by a clamp at the position of the stuffing box.

The invention will be better understood when reference is made to the following description and accompanying drawings in which:

Figure 1 represents a longitudinal sectional view of the improved packing box and gland assembly.

Figure 2 is a sectional view of the assembly taken along line 2—2 in Figure 1.

Figure 3 is an end elevational view of the assembly.

Figure 4 is a view in perspective of the improved gland shown during one of the steps in the fabrication process.

Figure 5 illustrates the manner in which the finished surfaces of the gland can be formed.

Figure 6 shows still another step in the process of fabrication.

Figure 7 illustrates the two sections of the improved gland.

Figure 8 is an enlarged section transversely of the joint between the two gland portions while Figure 9 is an elevational enlargement looking lengthwise of the gland joint.

Referring more particularly to Figures 1 and 2, reference numeral 1 designates a two-part casing, the parts of which are clamped or bolted together in any suitable manner after the impeller has been put in position. The impeller is indicated at 2 and may comprise, in the case of a so-called open runner impeller, a disc 3 to which is integrally secured as by molding a plurality of suitably curved blades 4. The disc 3 is provided with a hub 5 which in turn is keyed as indicated at 6 to a shaft 7, the shaft being provided with a threaded end portion 8. The shaft is usually of considerable length and is journaled within two bearings (not shown) in such a manner that the impeller 2 has an overhanging position. The shaft 7 is provided with a shoulder portion 9 against which the hub is forced and held into position by means of a nut 10 which engages the threads of the shaft portion 8.

In order to make the shaft as rigid as possible the latter is provided with a portion 11 of larger diameter at a position remote from the impeller. The right hand portion (not shown) of the two-part casing is provided with an intake passageway (not shown) in line with the shaft and the casing is also provided with a circumferential chamber leading to a disharge opening (not shown), the arrangement being such that as the shaft 7 is rotated, for example by means of an electric motor, the moving blades 4 of the impeller create a strong suction effect to cause liquid to move through the intake opening and to be discharged at the peripheral opening of the casing under considerable velocity and/or pressure.

In order to reduce the friction between the rear side of the disc 3 and the immediately adjacent surface of the casing 1, the disc may be spaced away from the casing by an appreciable distance indicated at 12. It is apparent that even the slightest amount of space 12 between the casing and the impeller will permit leakage of the liquid being pumped, this liquid tending to move downwardly through the space 12 both when the impeller is stationary and when the pump is being operated. This liquid, in the event that it is of a corrosive character such as dilute sulphuric acid, would tend to travel along the shaft 7 and unless prevented, would find its way into the bearings which it would immediately attack in addition to causing a corroding effect throughout the length of the shaft because all of these metals are easily machinable and therefore readily subject to attack by acid. A stuffing box is therefore necessary to prevent this leakage of liquid but in applying the box, extreme care must be taken to insure that the shaft shall not be subjected to undue friction and further, that the parts of the box or gland must always be in proper adjustment.

In order to provide for the stuffing box, a sleeve 13 is integrally joined to the casing as by molding. This sleeve may extend for a considerable distance and there may be provided three or more outwardly extending lugs 14, spaced preferably 90° apart about the outer surface of the sleeve. These lugs may be strengthened if desired by means of longitudinally extending webs 15, and may also be provided with openings 15' for receiving the bolts which serve to secure the casing 1 to any suitable supporting structure. The interior surface 16 of the sleeve 13 is of considerably greater diameter than the shaft 7 to leave a long cylindrical space or chamber in which packing rings 17 may be inserted.

The sleeve is provided with an inwardly extending flange 18 which has an interior diameter only a little larger than the size of the shoulder portion 9 of the shaft and therefore leaving as little space as possible between the flange and the shoulder. This flange provides an end seat for the packing material. The latter may be formed of a plurality of rings of ordinary packing, four rings as shown which snugly fit the space between the shaft and the interior surface of the sleeve. These rings are divided into two pairs by a spacer 19 to leave an annular space 20 between the two sets of rings, this space being adapted to receive grease so that the packing material will always remain impermeable to moisture and liquids. The grease is introduced through an opening 21 in the sleeve 13 and directly above the opening there is a heavy lug or projection 22 secured to the sleeve in any suitable manner and which is provided with a diagonally extending hole 23 for receiving a threaded pipe 24. The hole 23 registers at the bottom with the vertical opening 21 so that any grease material introduced into the pipe for example from a pressure grease gun or container, can be packed into the annular space 20 and thus find its way to the packing elements.

It is apparent that the packing rings 17 must make fairly tight contact with the shaft 7 and with the interior surface of the sleeve 13, if leakage along the shaft is to be avoided. For this purpose an improved form of gland generally indicated at 25 is provided. Heretofore great difficulty has been encountered in providing the necessary type of gland. Inasmuch as the liquid which tends to pass from the pump and along the shaft and the packing rings is of a highly corrosive character, such as dilute sulphuric acid, any small amounts of the liquid which get through are bound to attack the gland unless the latter is made of an acid-resistant metal. It will be understood in this connection that the casing 1, also the sleeve 13 are preferably made of high silicon iron since these parts can be molded to size and shape without necessitating any machine work so that it would be impractical to have the gland 25 made of any metal other than one which resists acid. However, a metal of this character, such as high silicon iron, cannot be cut by a tool and is therefore non-machinable in the strict sense of the term so that heretofore it was impossible to employ such a metal for this important function.

In accordance with the present invention, I have devised an improved manufacturing process which will permit the use of a non-machinable, acid-resistant metal for the gland member 25. As shown in Figure 4, the gland or clamp ring is first molded in cylindrical form having a closed perimeter. The ring portion 26 nearest the packing ring 17 has an outer diameter just slightly less than the interior diameter of the sleeve 13 and the inner diameter of the portion 26 is only slightly larger than the diameter of the shaft 7. There is an annular chamber indicated at 27 positioned on the inside of the ring about midway between the ends of the ring. A pair of oppositely disposed elongated openings 28 communicate between this chamber and the exterior of the ring, the purpose of these openings being to permit the leakage of grease or other lubricant which tends to collect within the chamber 27. At its other end, the ring is given a diametral surface 29 which is somewhat larger than the shaft, and positioned next to the chamber 27 but on the outside of the ring there is an outwardly extending flange 30. Directly to the left of the flange 30 the ring has a diametral size indicated at 31 which is slightly less than the size of the portion 26.

As stated hereinbefore, the ring may be readily molded from high silicon iron or other non-machinable metal and having a shape which has been decribed up to this point. The interior of the ring can be suitably cored, including the annular chamber 27. Inasmuch as the ring must be placed in position between the shoulder portions 9, 11 of the shaft and further since the interior diameter of the ring is not of sufficient size as to clear the shoulder 11, the ring eventually must be placed in position in split form and then clamped together. In order to accomplish this, there is provided, in accordance with the invention, a pair of oppositely disposed V-shaped slots 32 which extend longitudinally of the ring and are formed during the molding operation by suitably positioned core inserts. The thickness of the metal at the bottom of the slots is preferably the same throughout the length of the ring.

It is apparent from the inspection of the drawings that there are only three surfaces which need be finished and none of these surfaces require an actual cutting operation. These surfaces constitute the two ends of the ring, also the interior diameter of the ring portion 16 which comes in fairly close contact with the shaft 7. Figure 5 shows the manner in which the various finished surfaces may be ground by the abrading wheels 33 to proper smoothness and these grinding operations are performed while the ring 25 retains its continuous circularity.

After the grinding operation, the ring is placed between a pair of blocks 34 and the upper block is provided with a striking post 35 to which a hammer 36 may be applied. As the hammer strikes the upper block, the ring 25 is fractured at positions determined by the slots 32 so that the ring is now formed in two parts with rough irregular surfaces or edges at the positions of the grooves. When the depth of the slots 32 has been properly predetermined, the break is clean on account of the brittle character of the metal. Thus the two parts may be manually placed together and the surface irregularities 37 of one part exactly fit the surface irregularities of the other part. Consequently, there can be no movement or shifting between the parts in the radial or longitudinal directions provided the two parts are held firmly together.

The fact that the two parts perfectly mate with one another at the break or cleavage surfaces is important since it prevents any binding effect between the parts and the shaft because as was explained hereinbefore, the interior diameter of the ring portion 26 is only slightly larger than the size of the shaft 7 and any misfit resulting in misalignment would be bound to cause friction with the shaft.

In order to hold the two parts of the ring 25 together, there is provided a two-part clamp generally indicated in Figures 2 and 3 by the reference character 39. This clamp may be made of machinable material since it never comes into contact with the acid-containing liquid. In general it comprises when assembled, a cylindrical portion 40 which is adapted to bear against the surface 31 of the ring 25. There is a pair of radially extending parallelly aligned projections 41 formed at each side of the ring, these projections being bolted together as indicated at 42 to clamp the element 40 about the adjacent surface of the ring 25. Each pair of projections 41 is provided with a clearance slot 43 so that when the bolts 42 are tightened, a strong clamping effect is applied to the ring 25.

It is apparent that the longitudinal position of the gland ring 25 with respect to the packing ring 17 must be adjusted from time to time in order to increase the pressure exerted by the ring on the packing material. For this purpose there is a pair of oppositely disposed bolts indicated at 44 passing longitudinally through each pair of projections 41, these bolts being received by openings formed in a pair of flanges 45 which are provided on opposite sides of the sleeve 13. The bolts 44 may be of the headed type as indicated at 46 where they pass through the flange 45 and the opposite end of each bolt is threaded for receiving a nut 47. Thus, by tightening up the nuts 47, the two-part ring 25 may be moved inwardly toward the packing material 17 and inasmuch as the ring portion 26 is of a size as to permit the portion to enter the annular chamber between the shaft 7 and the sleeve 13, any desired pressure may be applied to the packing material 17. This pressure therefore assists the packing material in preventing any leakage of acid containing liquid along the shaft where it might normally and eventually reach the bearings in which the shaft is journaled.

It is apparent by reason of my invention that there is provided acid-resistant material such as high silicon iron at all of those places where the acid-containing liquid might contact and yet the necessary limitations of clearance, i. e. the closeness and accuracy of fit required in order to minimize friction are obtained by a non-cutting grinding operation. The ring 25 may be readily provided with the notches 32 by molding and may be easily ground to proper fit as illustrated in Figure 5 before it is split into two parts. The irregularity of the surface at the fractured joints eliminates any necessity for keying the two parts together since these parts are automatically brought into and held in alignment when a clamping effect is applied to the two ring parts.

Having thus fully described my invention, what I claim as new and desire to secure by Letters Patent is:

1. In a packing seal for pumps handling corrosive fluids, and including a gland of non-corrodible metal for holding the packing in place, the method of fabricating the gland by casting it in a ring form with longitudinal grooves along one of the peripheral surfaces, grinding the critical surfaces of the ring to size, then fracturing the ring at the grooves to divide the ring into a plurality of parts by placing the ring at said grooves between a pair of oppositely disposed wedge shaped members and applying a sudden impact to one of the members then clamping the parts together causing them to contact one another over substantially the entire length and width of each segmental part to form a circularly complete gland for the packing material.

2. The method of fabricating a packing gland from substantially unmachinable but frangible material comprising; casting the gland in the form of a hollow cylinder open at both ends and with axial grooves in the wall thereof extending along diametrically opposite lines, grinding portions of the casting to size, fracturing the ground casting along the grooves by a sudden impact, and clamping the parts together in their initial relative position to form a circularly complete gland.

OYSTEIN JACOBSEN.

REFERENCES CITED

The following references are of record in the file of this patent:

UNITED STATES PATENTS

| Number | Name | Date |
|---|---|---|
| 302,529 | Tyler | July 22, 1884 |
| 1,020,780 | Taylor | Mar. 19, 1912 |
| 1,057,201 | Young et al. | Mar. 25, 1913 |
| 1,465,988 | Kingsbury | Aug. 28, 1923 |
| 1,498,748 | Pierce | June 24, 1924 |
| 2,134,749 | Burt | Nov. 1, 1938 |
| 2,145,864 | Denneen et al. | Feb. 7, 1939 |
| 2,153,035 | Burt | Apr. 4, 1939 |
| 2,371,399 | Mantle | Mar. 13, 1945 |
| 2,371,400 | Mantle | Mar. 13, 1945 |